United States Patent [19]

Loesch

[11] Patent Number: 4,749,017

[45] Date of Patent: Jun. 7, 1988

[54] TIRE CORD

[75] Inventor: Richard W. Loesch, Akron, Ohio

[73] Assignee: General Tire, Inc., Akron, Ohio

[21] Appl. No.: 798,652

[22] Filed: Nov. 15, 1985

[51] Int. Cl.$^4$ .......................... B60C 9/00; D02G 3/48
[52] U.S. Cl. ..................... 152/527; 57/902; 152/451
[58] Field of Search ............... 152/451, 527, 540, 556; 57/200, 210, 212, 217, 243, 250, 258, 902; 428/295

[56] References Cited

U.S. PATENT DOCUMENTS

| | | | |
|---|---|---|---|
| 2,022,839 | 12/1935 | Austin | 57/215 X |
| 3,336,744 | 8/1967 | Peene | 57/217 |
| 4,020,887 | 5/1977 | Vlasov et al. | 152/451 |
| 4,258,543 | 3/1981 | Canevari et al. | 152/451 X |
| 4,349,063 | 9/1982 | Kikuchi et al. | 152/527 |
| 4,399,853 | 8/1983 | Morimoto et al. | 152/527 |
| 4,566,261 | 1/1986 | Brandyberry et al. | 57/200 |
| 4,606,392 | 8/1986 | Weidenhaupt et al. | 152/451 |

FOREIGN PATENT DOCUMENTS 53-30505  3/1978  Japan .................................. 152/527

OTHER PUBLICATIONS

Rodenkirch, B. L., Chemical Eng. Progress, vol. 63, No. 4, Apr. 1973, pp. 66-67.

Primary Examiner—Michael Ball
Assistant Examiner—Ramon R. Hoch

[57] ABSTRACT

A tire cord for the belts of a radial or bias-belted tire, is described as consisting of only two brass-coated metal wires which are helically twisted to have a lay length of from 14 to 18 millimeters. Each of the wires has a diameter of 0.28 millimeters, and is composed of steel which has a carbon content of at least 0.80%, by weight.

8 Claims, 1 Drawing Sheet

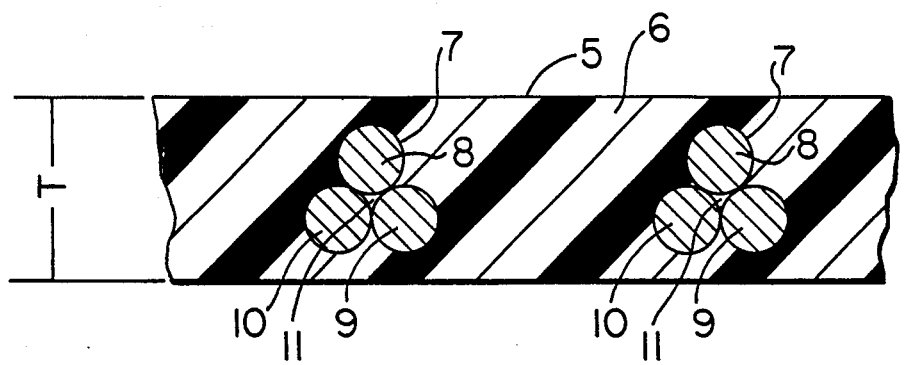
FIG. I (PRIOR ART)
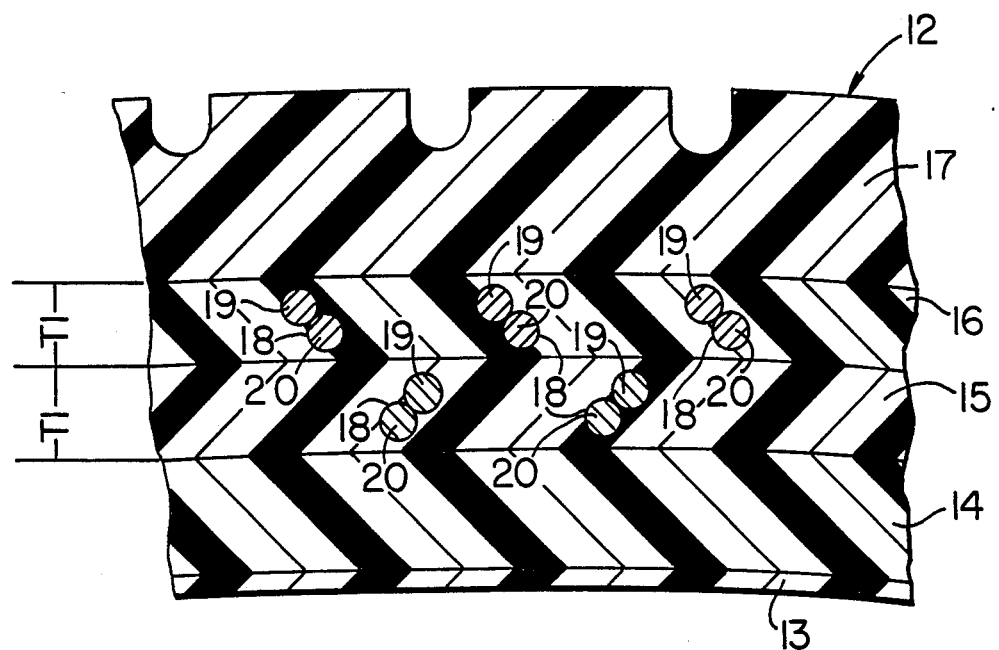
FIG. 2
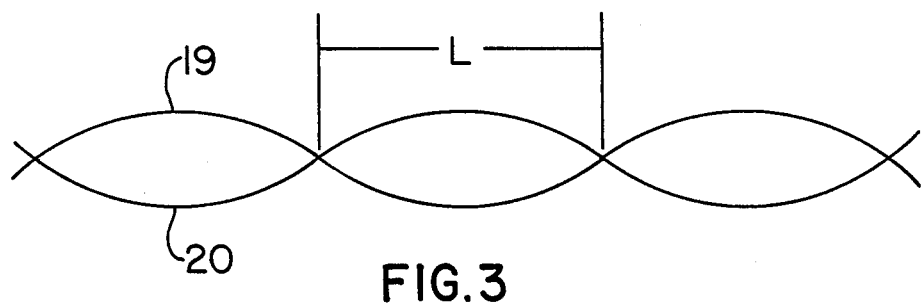
FIG. 3

TIRE CORD

BACKGROUND OF INVENTION

The invention relates to tires, especially to metal tire cords which reinforce the belts of radial or bias-belted tires.

U.S. Pat. Nos. 4,022,009; 4,176,513 and 4,258,543 are typical of the many patents that relate to metal tire cords that are composed of a number of round, metallic filaments or wires which are helically twisted together. U.S. Pat. No. 3,794,097 describes a single flat wire that can be used to reinforce a tire. In an article titled, 'Tire Cord Materials For the Belted Bias Tire', appearing in the April 1973 issue of Chemical Engineering Progress, there is a statement regarding the steel filaments of wire tire cords that, "These filaments are twisted together in groups of as few as three filaments to as many as 50, covering the wide range of strength to meet the tire performance requirements of everything from the smallest passenger tire to the giant earth mover." Thus, it is known to reinforce a tire with single, flat wires, or cords which are composed of at least three round metallic filaments which are twisted together.

In recent years, the automobile industry has undergone a radical change with the emphasis on smaller and lighter cars to obtain better gasoline mileage to reduce the consumption of one of our most valuable natural resources, petroleum. Tires play an important role in this change, because the resistance of tires to rolling along the roadway has a decided effect on the mileage and gasoline consumption of the vehicle. The rolling resistance of a tire is dependent on the flexibility of the tire as it moves through the footprint, or contact the roadway. Large tire cords composed of many filaments, are naturally more inflexible than smaller cords, and require more rubber to cover them to produce a heavier and stiffer tire with greater rolling resistance. The invention is directed to the provision of a small, highly flexible tire cord which, when used in the belts of a radial or bias-belted tire, decreases the rolling resistance of the tire to increase automobile mileage per gallon of gasoline.

SUMMARY OF INVENTION

Briefly stated, the invention is in a metal tire cord which consists of only two, brass coated metal filaments or wire which are twisted together in a conventional manner to have a lay length in the range of from 14 to 18 millimeters. Each of the metal wires is composed of a high tensile steel which has a carbon content that is at least 0.80% by weight.

DESCRIPTION OF DRAWING

Other advantages of the invention will become apparent from the following description of the drawing, wherein:

FIG. 1 is an enlarged cross-section of a portion of a belt with prior art tire cords;

FIG. 2 is an enlarged cross-section of a portion of a tire, and illustrates a pair of belts which are reinforced with tire cords that are made in accordance with the invention; and FIG. 3 is an exaggerated side view of a tire cord of the invention, designed to illustrate the lay length of the cord.

ENVIRONMENT OF INVENTION

With reference to FIG. 1, there is shown a typical belt 5 for circumferentially reinforcing a radial tire. The belt 5 is composed of rubbery material 6 in which are embedded a plurality of metal reinforcement cords 7 which are comprised of a minimal number of three, brass-coated steel strands or wires 8–10 which are twisted together in a conventional manner. It can be observed that a small cylindrical bore or void 11 is formed longitudinally of each of the cords 7. These voids 11, closed off by line contact between the wires 8–10, are difficult to fill with rubbery material. As a result, air and moisture collect in the voids to weaken the adhesive bond between the tire cord 7 and surrounding rubbery material and promote corrosion of the metal tire cords 7. The belt 5 has a minimal thickness T sufficient to adequately cover the metal cords 7.

With reference to FIGS. 2 and 3, there is shown a radial tire 12 which comprises, in successive layers, a fluid impervious innerliner 13, a carcass layer 14, a pair of belts 15, 16 and an outer tread 17.

THE INVENTION

The two belts 15, 16 are each reinforced with a plurality of unique tire cords 18 which are formed of only two brass-coated metal strands or wires 19, 20 which are helically twisted together to have a lay length L in the range of from 14 to 18 millimeters. Each of the two wires 19, 20 has a circular cross-section and a small diameter of about 0.28 millimeters, and is formed of a high tensile steel which has a carbon content of at least 0.80%, by weight, and more precisely 0.82%–83%, by weight, as compared with similar, prior art strands or filaments which generally have a carbon content of 0.72%, by weight, as evidenced by U.S. Pat. No. 4,176,513. Each of the high strength steel wires 19, 20 also includes, by weight, 0.21% silicon, 53% manganese, 0.016% phosphorous, and 0.008 sulfur.

The cost of these high tensile steel wires 19, 20 is higher than most other more conventional wires, but the overall cost of the tire cord 18 is not, because of the savings of using one less wire than the minimal three strands presently used. The unique tire cord 18 is highlyf lexible because it is formed of only two, high strength, smaller diameter steel wires to produce a composite, smaller diameter tire cord which requries less rubbery material to cover the cords 18. Consequently, the belt thickness TI is smaller than the aforementioned belt thickness T to provide a thinner belt with more than adequate strength to reinforce the radial tire 12.

Thus, there is a savings in the amount of rubber material used in the belts 15, 16 to provide a lighter weight tire 12 of comparable strength. The tire 12 has less rolling resistance, because of the greater flexibility of the thinner belts with the two strand metal tire cords 18, which are also lighter, in weight, to further reduce the weight of the tire 12. These important benefits are enhanced by still another important advantage; namely, the use of only two filaments or wires eliminates the center void 11 in which air and moisture can collect, thereby reducing the possibility of corrosion and improving the adhesion between the metal cords 18 and rubbery material which, because of the lack of voids, can more intimately contact the two metal strands 19, 20.

Thus, there has been described a very simple, but unique and highly beneficial 2-strand metal tire cord which is small, light weight, flexible and extremely strong for its size. These metal cords, when used in the belts of a radial or bias-belted tire, produce a lighter weight tire of comparable strength with improved rolling resistance characteristics to increase mileage and reduce gasoline consumption. Such a tire is very desirable for so-called "compact" cars being manufactured today. It can be appreciated that such weight savings can be used to offset the weight of increased safety devices which enhance the comfort and safety of the passenger riding inside an automobile equipped with tires which employ tire cords of the invention.

What is claimed is:

1. A belt for a tire of the group of radial and bias belted tires having a tire cord embedded in rubbery material, said tire cord being comprises of only two metal wires of circular cross-section which are helically twisted together to have a predetermined lay length (L) in the range of from 14 to 18 millimeters, each wire having a carbon content of 0.82% to 0.83% by weight, and having a small diameter of approximately 0.28 millimeters and an outer brass coating to increase adhesion of the cord with the surrounding rubbery material.

2. A tire, comprising:
   (a) at least one carcass ply;
   (b) a tread in juxtaposed, at least partially covering relation with the carcass ply; and
   (c) at least one belt sandwiched between the tread and carcass ply for circumferentially reinforcing the tire, the belt including a plurality of reinforcement cords, each of which cords is comprised of only two metal wires of circular cross-section which are helically twisted together.

3. The tire of claim 2, wherein each wire is composed of a high tensile steel which has a carbon content of at least 0.80%, by weight.

4. The tire of claim 3, wherein each wire has a carbon content of 0.82%–0.83% by weight.

5. The tire of claim 4, wherein each wire has a small diameter of approximately 0.28 millimeters.

6. The tire of claim 5, wherein the two steel wires are helically twisted together to have a lay length (L) in the range of from 14 to 18 millimeters.

7. The tire of claim 6, wherein each of the steel wires has an outer brass coating.

8. The tire of claim 7, wherein each of the steel wires includes, by weight, 0.21% silicon, 0.53% manganese, 0.016% phosphorus, and 0.008% suflur.

* * * * *

REEXAMINATION CERTIFICATE (1027th)

United States Patent [19]

Loesch

[11] B1 4,749,017
[45] Certificate Issued  Mar. 28, 1989

[54] TIRE CORD

[75] Inventor: Richard W. Loesch, Akron, Ohio

[73] Assignee: General Tire, Inc., Akron, Ohio

Reexamination Request:
No. 90/001,559, Jul. 21, 1988

Reexamination Certificate for:
Patent No.: 4,749,017
Issued: Jun. 7, 1988
Appl. No.: 798,652
Filed: Nov. 15, 1985

[51] Int. Cl.⁴ .......................... B60C 9/00; D02G 3/48
[52] U.S. Cl. ................................. 152/527; 57/902; 152/451
[58] Field of Search ................... 152/451, 527; 57/902

[56]  References Cited

U.S. PATENT DOCUMENTS 1,903,925  4/1933  Johnson .
2,353,432  7/1944  Arrington .
4,408,444  10/1983  Baillievier .

FOREIGN PATENT DOCUMENTS 0144811  of 1984  European Pat. Off. .
2139244  of 1972  France .
17462/73  4/1978  Japan . .
128385  7/1981  Japan .

OTHER PUBLICATIONS

Research Disclosure dated Jul. 1977 entitled "Reinforcing Cord for Elastomeric Articles".
Research Disclosure Article, dated Jun. of 1978 and captioned "Four Wire Strand".

*Primary Examiner*—Michael W. Ball
*Assistant Examiner*—Ramon R. Hoch

[57]  ABSTRACT

A tire cord for the belts of a radial or bias-belted tire, is described as consisting of only two brass-coated metal wires which are helically twisted to have a lay length of from 14 to 18 millimeters. Each of the wires has a diameter of 0.28 millimeters, and is composed of steel which has a carbon content of at least 0.80%, by weight.

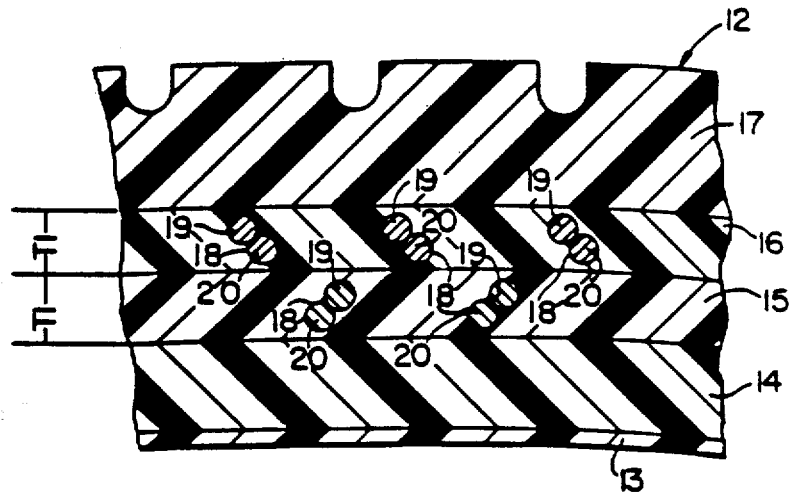

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2-8 is confirmed.

Claim 1 is cancelled.

* * * * *